（12） United States Patent
Perez-Feliciano et al.

(10) Patent No.: US 9,848,121 B2
(45) Date of Patent: Dec. 19, 2017

(54) METHOD AND DEVICE TO OBTAIN AN IMAGE ALIGNED WITH A REFERENCE IMAGE

(71) Applicant: Lenovo (Singapore) Pte. Ltd., New Tech Park, Singapore (SG)

(72) Inventors: David Perez-Feliciano, Morrisville, NC (US); Guillermo Regulez, Wake Forest, NC (US); Justin Michael Ringuette, Morrisville, NC (US)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 0 days.

(21) Appl. No.: 14/510,726

(22) Filed: Oct. 9, 2014

(65) Prior Publication Data

US 2016/0105604 A1    Apr. 14, 2016

(51) Int. Cl.
*H04N 5/232* (2006.01)
(52) U.S. Cl.
CPC ................ *H04N 5/23222* (2013.01)
(58) Field of Classification Search
CPC ........................ H04N 5/23219; H04N 5/23222
See application file for complete search history.

(56) References Cited

U.S. PATENT DOCUMENTS

| | | | |
|---|---|---|---|
| 9,106,821 B1 * | 8/2015 | Baldwin | H04N 5/23219 |
| 9,160,993 B1 * | 10/2015 | Lish | H04N 5/23229 |
| 9,344,633 B2 * | 5/2016 | Kawahara | H04N 5/23293 |
| 2007/0030363 A1 * | 2/2007 | Cheatle | H04N 1/00183 348/239 |
| 2009/0091710 A1 * | 4/2009 | Huebner | G03B 21/14 353/28 |
| 2010/0141781 A1 * | 6/2010 | Lu | G06K 9/00912 348/222.1 |
| 2011/0008036 A1 * | 1/2011 | Takatsuka | G03B 15/00 396/283 |
| 2014/0197922 A1 * | 7/2014 | Stanwood | H04N 5/23219 340/5.83 |
| 2015/0029304 A1 * | 1/2015 | Park | H04N 5/23238 348/36 |
| 2015/0077567 A1 * | 3/2015 | Scalisi | H04N 5/23238 348/152 |

FOREIGN PATENT DOCUMENTS

CN    103139457    6/2013

* cited by examiner

*Primary Examiner* — Amy Hsu
(74) *Attorney, Agent, or Firm* — Dean D. Small; The Small Patent Law Group, LLC (57) ABSTRACT

Methods and electronic devices are provided that obtain a reference image of an imaged body using a first camera disposed on a first side of an electronic device, obtain image data of the imaged body using a second camera disposed on an opposite, second side of the electronic device, and provide guidance to an operator of the electronic device based on a comparison between the reference image and the image data. The guidance notifies the operator how to move the electronic device so that the imaged body in the image data is closer to being spatially aligned with a reference location of the imaged body in the reference image.

19 Claims, 3 Drawing Sheets

METHOD AND DEVICE TO OBTAIN AN IMAGE ALIGNED WITH A REFERENCE IMAGE

FIELD

Embodiments of the present disclosure generally relate to acquiring images using mobile devices.

BACKGROUND

Mobile devices such as mobile phones or cell phones are used by many people to take photographs and/or videos. These devices can include cameras on opposite sides of the devices. A forward facing camera can produce lower resolution images that allow the operator of the mobile device to see his or her image on a display of the mobile device. But, if the operator wishes to take a photograph of himself or herself using the higher resolution camera on the opposite side of the mobile device, the operator may not be able to see the image on the display. For example, the screen of the mobile device may be facing away from the operator such that the operator cannot see the image being acquired. As a result, the image that is obtained may not be desired in that the operator may appear in a location of the image that is not desired, such as on the extreme edges of the image, in a position that blocks another object from the image, or the like.

In order to avoid this situation, some operators of the mobile devices are required to use reflective surfaces (e.g., mirrors) to assist in the taking of the images with the rear facing camera of the mobile device. But, such reflective surfaces may not always be available to the operator. Additionally, some operators may limit themselves to the forward facing camera of the mobile device. But, this camera may be limited in the amount of resolution in the images that are acquired relative to the resolution of the rear facing camera.

BRIEF SUMMARY

In accordance with an embodiment, a method (e.g., for obtaining an image using a mobile device) includes obtaining a reference image of an imaged body using a first camera disposed on a first side of an electronic device, obtaining image data of the imaged body using a second camera disposed on an opposite, second side of the electronic device, and providing guidance to an operator of the electronic device based on a comparison between the reference image and the image data. The guidance notifies the operator how to move the electronic device so that the imaged body in the image data is closer to being spatially aligned with a reference location of the imaged body in the reference image.

In another embodiment, a device (e.g., a mobile device) includes a housing having a first side and an opposite second side, a first camera on the first side of the housing, an electronic display on the first side of the housing, a second camera on the second side of the housing, a processor, and a storage medium storing program instructions accessible by the processor. Responsive to execution of the program instructions, the processor obtains a reference image of an imaged body using the first camera, obtains image data of the imaged body using the second camera, and provides guidance to an operator based on a comparison between the reference image and the image data. The guidance notifies the operator how to move the housing so that the imaged body in the image data is closer to being spatially aligned with a reference location of the imaged body in the reference image.

In another embodiment, another device (e.g., a mobile device) includes a housing having a front camera on a front side of the housing and a rear camera on a rear side of the housing. The front camera obtains a reference image of an operator that indicates a reference location of the operator in an image frame of the reference image. The device also includes a processor and a storage medium storing program instructions accessible by the processor. Responsive to execution of the program instructions, the processor obtains image data of the operator using the second camera, compares a current location of the operator in the image data with the reference location of the operator in the reference image, and provides guidance to the operator based on a difference between the current location of the operator in the image data and the reference location of the operator in the reference image. The guidance notifies the operator how to move the housing so that the current location of the operator in the image data moves toward the reference location.

DETAILED DESCRIPTION

It will be readily understood that the components of the embodiments as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, etc. In other instances, well-known structures, materials, or operations are not shown or described in detail to avoid obfuscation. The following description is intended only by way of example, and simply illustrates certain example embodiments.

One or more embodiments of the inventive subject matter described herein provide devices and methods for ensuring that a body that is imaged by a mobile device appears in a desired area of an image. For example, when a person acquires a self-portrait image (e.g., commonly referred to as a "selfie") using a mobile device, the person may be the imaged body in the image, but may not be able to see where the person appears in the image without the aid of extra components until after the image is acquired. While the mobile device may have a camera on the same side of the device as a display screen of the mobile device (e.g., a front or forward-facing camera), the person may wish to acquire the self-portrait image using another camera on another side of the mobile device (e.g., a rear or rear-facing camera). The rear camera may have greater resolution (e.g., more pixels or data) than the front camera, or may have other characteristics that cause the person to desire to take the self-portrait image with the rear camera instead of the front camera.

But, if the person does not have access to a mirror or other reflective object, the person may not be able to ensure that he or she is properly located in the image frame of the self-portrait image. While the rear camera is facing the person during acquisition of the image, the display screen is facing away from the person. In order to ensure that the person is located in a desired location in the image frame, one or more embodiments of the subject matter described herein provide devices and methods that obtain a reference image of the person using the front camera. The person can make sure that he or she is in a desired or designated location within the image taken by the front camera by watching the image shown on the display screen while the reference image is acquired. The person can then turn the mobile device around so that the rear camera is facing the person while the display screen is facing away from the person. The mobile device can compare one or more images or videos acquired by the rear camera to the reference camera to determine if the person appears in these images or videos in the same or approximately the same location as the person appears in the reference image.

If the person is in the same or approximately the same location as the reference image, then the self-portrait image is acquired and/or saved by the rear camera. But, if the person is not in the same or approximately the same location, then the mobile device can generate guidance (e.g., an instruction, command, direction, etc.) to direct the person how to move the mobile device. This guidance can inform the person how to change the position and/or orientation of the mobile device so that the person appears in the image obtained by the rear camera in the same or approximately the same location as in the reference image. The guidance can be repeated until the person appears in the same or approximately same location. The guidance can include audible directions (e.g., "move right," "move left," "tilt upward," "rotate right," etc.), audible sounds (e.g., a series of beeps or other sounds that change frequency, pitch, duration, or the like, based on how far the person is from the reference image in the self-portrait image), vibrations of the mobile device (e.g., having a frequency, duration, or the like, that is based on how far the person is from the reference image in the self-portrait image), etc. The person may then be able to orient the mobile device so that the person appears in the desired location of the image as indicated by the reference image.

Figure 1:
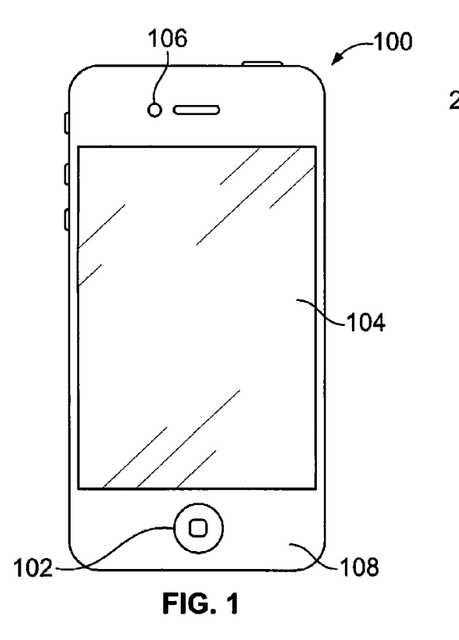
FIG. 1 illustrates a front view of a mobile device according to one embodiment.
Figure 2:
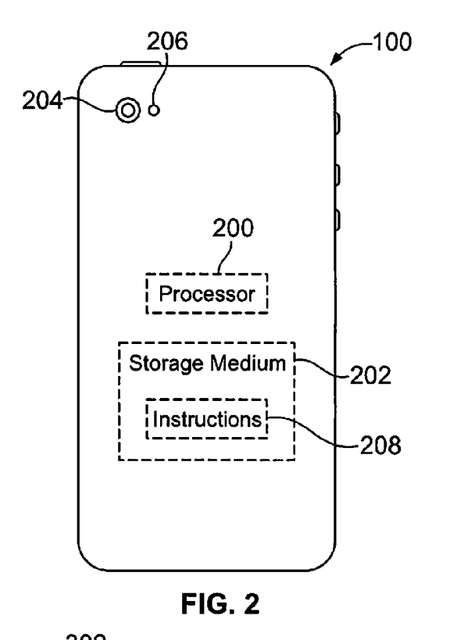
FIG. 2 illustrates a rear view of the mobile device shown in FIG. 1.

FIG. 1 illustrates a front view of a mobile device 100 according to one embodiment. FIG. 2 illustrates a rear view of the mobile device 100 shown in FIG. 1. The mobile device 100 includes a housing 108 having one or more components disposed therein and/or coupled to the housing 108. A front side of the housing 108 is shown in FIG. 1 while an opposite, second side of the housing 108 is shown in FIG. 2. The components of the mobile device 100 can include one or more processors 200 (shown in FIG. 2, e.g., a microprocessor, microcomputer, application-specific integrated circuit, etc.), one or more local storage media 202 (shown in FIG. 2, and also referred to as a memory), a user interface 102 (shown in FIG. 1), an electronic display 104 (also referred to as a display screen), a first camera 106 (also referred to as a front or forward-facing camera), and a second camera 204 (also referred to as a rear or rear-facing camera). These components can be operatively coupled to one another, and can be in communication with one another, by way of one or more internal communication links, such as an internal bus, and/or one or more wireless communication links.

The user interface 102 can represent a button, switch, or the like, that can be engaged by an operator of the mobile device 100. The user interface 102 can be a mechanical button, switch, or the like, or can be graphically displayed as an icon on the display screen 104 for selection by the operator. The display screen 104 can electronically display images and/or videos, such as images and/or videos obtained by the camera 106 and/or the camera 204. The display screen 104 may be touch sensitive to various types of touch and gestures. Alternatively, the display screen 104 may not be sensitive to touch.

The local storage medium 202 can encompass one or more memory devices of any of a variety of forms (e.g., read only memory, random access memory, static random access memory, dynamic random access memory, etc.) and can be used by the processor 200 to store and retrieve data. The data that is stored by the local storage medium 202 can include, but need not be limited to, images, videos, operating systems, applications, user collected content and informational data. Each operating system includes executable code (e.g., instructions 208) that controls basic functions of the communication device, such as interaction among the various components, communication with external devices, and storage and retrieval of applications and data to and from the local storage medium 202. Each application includes executable code that utilizes an operating system to provide more specific functionality for the communication devices.

The cameras 106, 204 generate image data representative of images and/or videos. The cameras 106, 204 may have different operating characteristics. For example, the cameras 106, 204 can generate image data having different resolution (e.g., different amounts of pixels for the same image, different amounts of data for the same image, different ranges of aperture sizes, different shutter speeds, or the like). In one embodiment, the front camera 106 may have a lower resolution than the rear camera 204. For example, the front camera 106 may generate images having up to 1.2 megapixels (or another amount) while the rear camera 204 generates images having more than 1.2 megapixels (e.g., up to eight megapixels, up to ten megapixels, up to twelve megapixels, or a larger or different amount). In one aspect, the front camera 106 may not have a flash or other light-generating device that can generate light to aid in the obtaining of images or video in low light situations. For example, the front side of the housing 108 may not include any flash or other light-generating device. The rear side of the housing 108 can have a flash or light-generating device 206. This device 206 can include a light emitting diode (LED) or another type of device that generates light to aid in obtaining images and/or videos using the rear camera 204 during low light situations. The light-generating device 206 may be disposed on the housing 108 so that the light-generating device 206 can generate light that is viewable in images obtained by one camera 204, but not the other camera 106. Alternatively, both or neither of the cameras 106, 204 may have a light-generating device 206.

Figure 3:
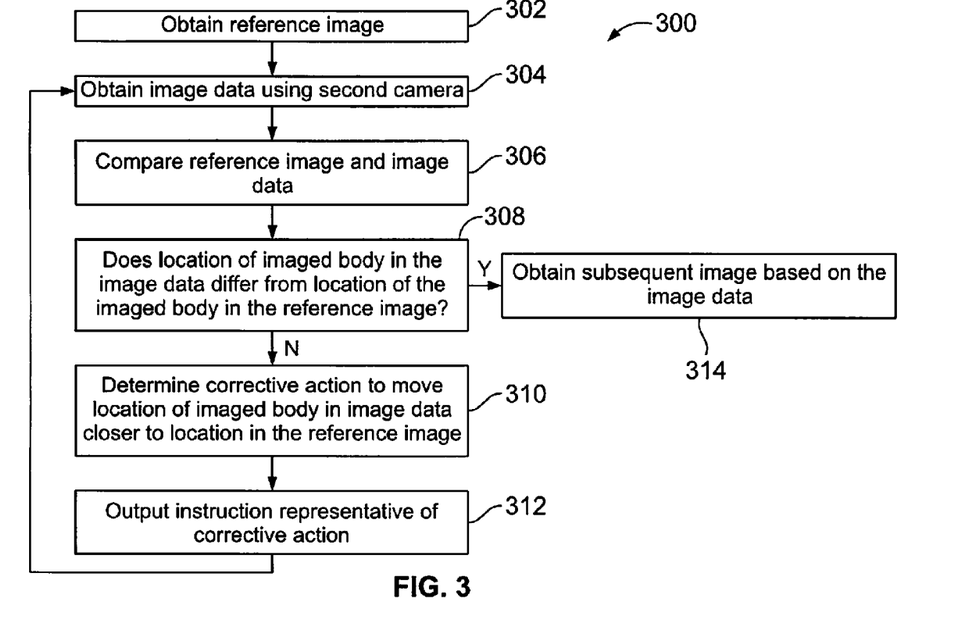
FIG. 3 illustrates a flowchart of a method for obtaining an image according to one embodiment.

FIG. 3 illustrates a flowchart of a method 300 for obtaining an image according to one embodiment. The method 300 can be used to ensure that an image obtained using one camera 106, 204 (shown in FIGS. 1 and 2) of the mobile device 100 (shown in FIG. 1) is spatially aligned with respect to another image obtained by another camera 106, 204 of the mobile device 100. For example, an operator of the mobile device 100 can obtain a reference image of the operator using the front camera 106 while the operator is viewing the reference image on the display screen 104 (shown in FIG. 1). The operator can then use the rear camera 204 to obtain a subsequent image, with the mobile device 100 providing guidance to the operator as to how to move the mobile device 100 to ensure that the operator appears in the same positions in the subsequent image as in the previously obtained reference image. While the description herein focuses on still or static images, alternatively, the method 300 also may be used with videos.

At 302, a reference image is obtained. The reference image may be obtained by taking an image using the camera 106 on the front side of the mobile device 100. Alternatively, the reference image may be obtained from the storage medium 202 (shown in FIG. 2). A previously obtained reference image may be used as a default image that is compared to several other images as described below. Using such a previously obtained image can avoid having the operator repeatedly obtain new reference images. For example, the operator can obtain a reference image and use the same reference image to compare to other subsequent images (e.g., self-portrait images) that are obtained at different times, different days, different months, and the like.

The reference image can be obtained when an imaged body in the reference image is in a location selected by the operator. For example, the operator can view himself or herself in the reference image with the reference image or a live video feed of the front camera 106 being shown on the display screen 104. Because the operator is facing the front camera 106 to obtain a self-portrait reference image, the operator also may be able to see the reference image or a live video feed of the front camera 106. When the operator is in a desired location in the reference image (e.g., in the center of the image frame or in another location), the operator may engage the user interface 102 (shown in FIG. 1) of the mobile device 100 to capture the reference image.

Figure 4:
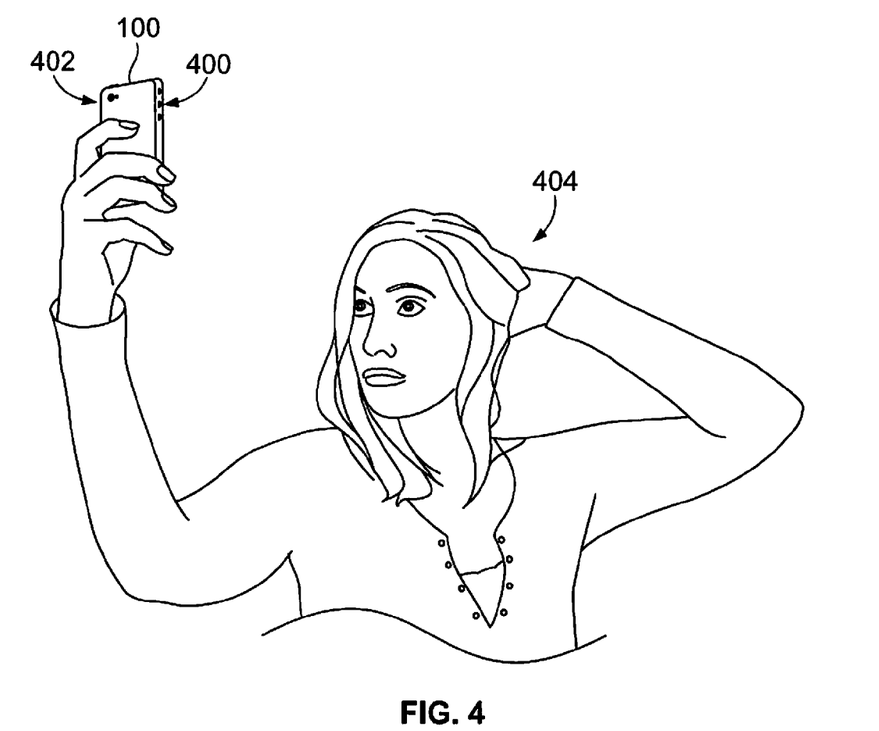
FIG. 4 illustrates an operator of the mobile device shown in FIG. 1 obtaining a reference image of the operator using a front camera of the mobile device according to one embodiment.

With continued reference to the flowchart of the method 300 shown in FIG. 3, FIG. 4 illustrates an operator 404 of the mobile device 100 obtaining a reference image of the operator using the front camera 106 (shown in FIG. 1) of the mobile device 100 according to one embodiment. As shown in FIG. 4, a front side 400 of the mobile device 100 is facing the operator 404 during acquisition of the reference image. The front side 400 of the mobile device 100 can represent the side of the mobile device 100 that is visible in FIG. 1. A back side 402 of the mobile device 100 is facing away from the operator 404 during acquisition of the reference image. The back side 402 of the mobile device 100 can represent the side of the mobile device 100 that is visible in FIG. 2.

The operator 404 may move the mobile device 100 while the field of view of the front camera 106 is shown on the display screen 104 (shown in FIG. 1). The operator 404 can tilt, rotate, or otherwise move the mobile device 100 until the operator 404 appears in the reference image shown on the display screen 104 in a position within the image frame that the operator wishes to appear in the subsequent image (as described below). For example, the operator 404 may wish to have his or her face appear in the center of the image frame, along the bottom of the image frame, or in another location. The operator 404 can then engage or otherwise actuate the user interface 102 (shown in FIG. 1) of the mobile device 100 to cause the mobile device 100 (e.g., the processor 200) to capture the reference image. The reference image may be at least temporarily saved in the storage medium 202 (shown in FIG. 2) of the mobile device 100.

Alternatively, the reference image may not include the operator 404. For example, instead of the reference image being a self-portrait of the operator 404, the reference image may be an image of another imaged body. In another embodiment, the reference image may not be obtained by the camera 106 or the camera 202 of the mobile device 100. For example, the reference image may be obtained by another camera or device, such as a previously owned mobile device 100 of the operator 404. In another embodiment, the reference image can include one or more locations on the display screen 104 that are selected by the operator 404. For example, instead of using the reference image to indicate where the operator 404 would like to appear in the subsequent image, the operator 404 may touch or otherwise select the areas of the display screen 104 where the operator would like to appear in the subsequent image. The area or areas of the display screen 104 that are selected can represent the reference image.

Returning to the description of the flowchart of the method 300 shown in FIG. 3, at 304, subsequent image data is obtained. This image data may be obtained after acquisition of the reference image using the front camera 106, after acquisition of the reference image from the storage medium 202, or after acquisition of the reference image from another source. In one aspect, image data changes as the relative positions and/or orientations of the mobile device 100 and the operator 404 change. For example, the image data can be a live video feed or real-time video of the field of view of the rear camera 204 in one embodiment. As the operator 404 tilts, rotates, or otherwise moves the mobile device 100, the image data may change, such as by the location of the operator 404 in the image data changing.

Figure 5:
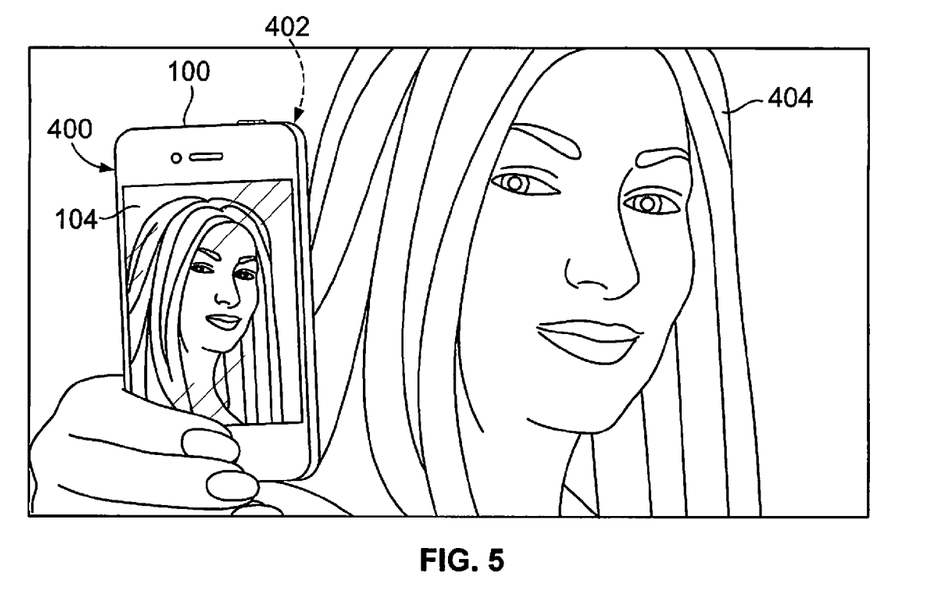
FIG. 5 illustrates the operator of the mobile device obtaining image data using a rear camera shown in FIG. 2 of the mobile device according to one embodiment.

FIG. 5 illustrates the operator 404 of the mobile device 100 obtaining the image data using the rear camera 204 (shown in FIG. 2) of the mobile device 100 according to one embodiment. As shown in FIG. 5, the back side 402 of the mobile device 100 is facing the operator 404 and the front side 400 of the mobile device 100 is facing away from the operator 404 during acquisition of the image data. As a result, the display screen 104 of the mobile device 100 is facing away from the operator 404. The back side 402 of the mobile device 100 can represent the side of the mobile device 100 that is visible in FIG. 2. While the display screen 104 can optionally display the image data generated by the rear camera 204 (as shown in FIG. 5), the operator 404 may be unable to see the image data due to the display screen 104 facing away from the operator 404. Consequently, the operator 404 is unable to determine if the operator is visible in the image data, is centered in the image data, or the like.

Returning to the description of the flowchart of the method 300 shown in FIG. 3, at 306, the reference image is compared with the image data. For example, the reference image previously obtained by the front camera 106, obtained from the storage medium 202, or as otherwise obtained can be compared to the image data being obtained by the rear camera 204. This comparison can take place as the image data is being acquired by the rear camera 204. For example, during the time period that the image data is being acquired by the rear camera 204, some or all of this image data can be compared to the reference image. Because the image data may not be visible to the operator 404 during this time period due to the display screen 104 of the mobile device 100 pointing away from the operator 404 (as shown in FIG. 5), this comparison may not be able to be performed by the operator 404. Additionally, if no other persons are around or available to make this comparison (as may occur when the operator 404 is attempting to acquire a "selfie" or self-portrait image), the processor 200 (shown in FIG. 2) of the mobile device 100 may need to perform this comparison.

The image data generated by the rear camera 204 can be compared with the reference image to determine if one or more imaged bodies in the image data appear in the same or approximately the same locations as these one or more imaged bodies appear in the reference image. In one aspect, the processor 200 can examine characteristics of the reference image and/or image data to determine which portions of the reference image and/or image data represent the same imaged object. These characteristics can include the colors, intensities, luminance, or other characteristics of pixels in the image and/or image data. The pixels that have the same or similar characteristics (e.g., the pixels having characteristics with values that are within a designated range of each other, such as 1%, 5%, 10%, or another percentage or fraction) and that are within a designated distance of one or more other pixels having the same or similar characteristics in the image and/or image data (e.g., within a distance that encompasses no more than 1%, 5%, 10%, or another percentage or fraction of the field of view of the camera 204, the width and/or height of the display screen 104, or the like), may be grouped together and identified as being representative of the same object. For example, a first pixel having a first color or intensity (e.g., associated with a color having a wavelength of 0.7 μm) and a second pixel having a second color or intensity that is within a designated range of the first color or intensity (e.g., within 1%, 5%, 10%, or another value of 0.7 μm) may be grouped together as being representative of the same object if the first and second pixels are within the designated range of each other. Optionally, several pixels may be grouped together if the pixels are within the designated range of each other. Those pixels that are in the same group may be designated as representing an object in the reference image and/or the image data.

Figure 6:
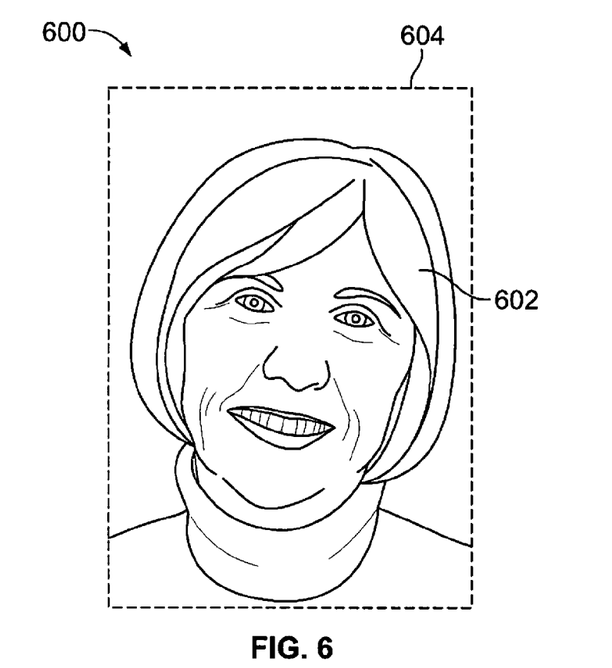
FIG. 6 illustrates one example of a reference image.

FIG. 6 illustrates one example of a reference image 600. The reference image 600 shows an imaged object of interest 602, such as a self-portrait image of the operator 404. The reference image 600 defines an image frame 604 that represents the outer boundaries of the reference image 600. The image frame 604 may be sized such that the display screen 104 of the mobile device 100 displays only a single image frame 604 at a time. Alternatively, the display screen 104 may display only a portion of the image frame 604 or an area that is larger than the image frame 604. The processor 200 may examine the reference image 600 to identify one or more groups of pixels or other portions of the image 600 that represent the same object. In the illustrated example, the processor 200 may determine that the pixels representative of the face of the object of interest 602 have sufficiently similar characteristics to be grouped together.

The processor 200 can then determine where these pixels are located in the image frame 604. The locations or areas of the image frame 604 where these pixels are located may be identified as a designated area of the image frame. This designated area can represent where the imaged object is to appear in the subsequent image obtained by the rear camera 204. For example, the designated area can represent where the face of the operator 404 is to appear in an image obtained by the rear camera 204. Alternatively, the operator 404 may select the locations of where the imaged object is to appear in the subsequent image without the front camera 106 acquiring a reference image. For example, the operator 404 may touch the areas of the display screen 104 where the operator 404 wants his or her face to appear in the subsequent image acquired by the rear camera 204.

Figure 7:
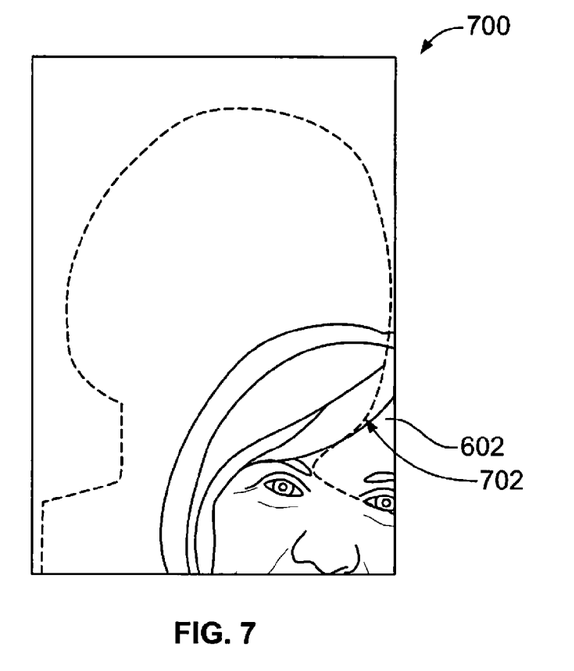
FIG. 7 illustrates one example of a comparison of the reference image shown in FIG. 6 to image data obtained by the rear camera of the mobile device.

FIG. 7 illustrates one example of a comparison of the reference image 600 to image data 700 obtained by the rear camera 204 of the mobile device 100. An area of interest 702 represents the location or locations of where the object of interest 602 appears in the reference image 600. The area of interest 702 optionally can be referred to as a reference location of the imaged body 602. In the illustrated example, the processor 200 of the mobile device 100 can compare the reference image 600 or the location or locations of where the object of interest 602 appears in the reference image 600 to the image data 700 acquired by the rear camera 204.

As shown in FIG. 7, due to movement of the operator and/or the mobile device 100, the operator is not in the same location in the image data 700 as he or she appears in the reference image 600. The processor 200 can examine the image data 700 to identify where the imaged object of interest 602 appears in a manner similar to the manner in which the processor 200 identified the location of the imaged object of interest 602 in the reference image 600. For example, the processor 200 can identify and group similar pixels with each other and identify the grouped pixels as being representative of the object of interest 602. In the illustrated example, there is relatively little spatial overlap between the location of the imaged object of interest 602 in the image data 700 and the location of the imaged object of interest 602 in the reference image 600.

In one embodiment, the processor 200 can compare the image data 700 with the reference image 600 by calculating an amount of spatial overlap between locations of the object of interest 602 in the image data 700 and locations of the object of interest 602 in the reference image 600. The amount of spatial overlap can include a fraction, percentage, or other calculation of the area, number of pixels, or the like, that the object of interest 602 is in the area of interest 702 in the image data 700. In the illustrated example, approximately 20% of the area of interest 702 is overlapped by the object of interest 602 in the image data 700.

Returning to the description of the flowchart of the method 300 shown in FIG. 3, at 308, a determination is made as to whether the location of the imaged body or object of interest 602 in the image data obtained by the rear camera 204 differs from the location of the imaged body or object of interest 602 in the reference image 600. In one example, the processor 200 can calculate the amount of overlap between the area of interest 702 and the object of interest 602 in the image data 700 and compare this overlap to a designated threshold, such as 99%, 95%, 90%, 75%, or the like. If the overlap exceeds the threshold, then the processor 200 may determine that the location of the object of interest 602 is in the same or approximately the same location in the image data 700 as in the reference image 600. As a result, flow of the method 300 can proceed to 314.

On the other hand, if the amount of overlap does not exceed the threshold, then the processor 200 can determine that the location of the object of interest 602 is not in the same or approximately same location in the image data 700 as in the reference image 600. As a result, guidance may need to be provided to the operator 400 to change the orientation of the mobile device 100 and/or operator 404 in order to move where the object of interest 602 appears in the image data 600. In such a scenario, flow of the method 300 can proceed to 310. The threshold to which the amount of overlap is compared can be set and/or modified by the operator 404 to control how closely the object of interest 602 is to appear in the same location in the image data 700 and in the reference image 600. For example, the threshold may be increased to require the object of interest 602 to be closer to the area of interest 702 in the image data 700 before instructions to the operator 404 cease, or may be decreased to allow the object of interest 602 to be farther from the area of interest 702 before instructions to the operator 404 are stopped, as described below.

At 310, a corrective action to move the location of the imaged body or object of interest in the image data closer to the area of interest 702 is determined. For example, the processor 200 can examine where the object of interest 602 appears in the image data 700 relative to the location of the area of interest 702, and determine how the mobile device 100 should be moved so that the object of interest 602 moves closer to the area of interest 702. If the object of interest 602 is to the right of the area of interest 702, then the processor 200 can determine that the mobile device 100 should be tilted, rotated, or otherwise moved to the left to move the object of interest 602 in the image data 700 closer to the area of interest 702. If the object of interest 602 is to the left of the area of interest 702, then the processor 200 can determine that the mobile device 100 should be tilted, rotated, or otherwise moved to the right to move the object of interest 602 in the image data 700 closer to the area of interest 702. If the object of interest 602 is below the area of interest 702, then the processor 200 can determine that the mobile device 100 should be tilted, rotated, or otherwise moved upward to move the object of interest 602 in the image data 700 closer to the area of interest 702. If the object of interest 602 is above the area of interest 702, then the processor 200 can determine that the mobile device 100 should be tilted, rotated, or otherwise moved downward to move the object of interest 602 in the image data 700 closer to the area of interest 702. The processor 200 optionally may determine that a combination of moving the mobile device 100 left, right, up, and/or down may be needed to move the object of interest 602 closer to the area of interest 702. The movements that are determined by the processor 200 may be the corrective action that is determined at 310.

At 312, guidance is output by the mobile device 100. The guidance can represent the corrective action that is determined by the processor 200. The guidance can direct the operator 404 how to move the mobile device 100 in order to move the object of interest 602 in the image data 700 to be closer to the area of interest 702. The guidance can be provided during acquisition of the image data 700 so that the operator 404 is able to change the location of the object of interest 602 in the image data 700 while the processor 200 determines if further guidance needs to be provided to move the object of interest 602 closer to the area of interest 702 in the image data 700.

In one example, the guidance may be an audible instruction that is played by one or more speakers of the mobile device 100. Such an instruction can audibly state "down," "up," "left," "right," or the like, to instruct the operator 404 how to move the mobile device 100. Optionally, another sound may be output by the mobile device 100. The tone, pitch, frequency, or the like, of the sound may change based on how far the object of interest 602 is from the area of interest 702 in the image data 700. For example, the tone or pitch of the sound may be lower when the object of interest 602 is farther from the area of interest 702 than when the object of interest 602 is closer to the area of interest 702. As another example, several sounds may be repeatedly generated, with a frequency at which the sounds are generated changing based on how far or close the object of interest 602 is from the area of interest 702. As the object of interest 602 is farther from the area of interest 702, the frequency at which the sounds are generated (e.g., how often the sounds are generated during a period of time) may decrease relative to when the object of interest 602 is closer to the area of interest 702.

As another example, the guidance can be the activation (e.g., flashing) of the light-generating device 206. The processor 200 can change the frequency at which the light-generating device 206 (which is facing the operator 404) activates and deactivates based on how far or close the object of interest 602 is to the area of interest 702 in the image data 700. The magnitude of the difference between the location of the object of interest 602 and the area of interest 702 can determine the frequency of the flashes. For example, longer activations of the light-generating device 206 separated by time periods where the light-generating device 206 is deactivated can indicate that the object of interest 602 is farther from the area of interest 702 while shorter activations of the light-generating device 206 can indicate that the object of interest 602 is closer to the area of interest 702.

As another example, the guidance can be the color of the light generated by the light-generating device 206. The processor 200 can change the color of the light generated by the light-generating device 206 (which is facing the operator 404) based on how far or close the object of interest 602 is to the area of interest 702 in the image data 700. The magnitude of the difference between the location of the object of interest 602 and the area of interest 702 can determine the color of the light. For example, a blue or green light may indicate that the object of interest 602 is farther from the area of interest 702 while yellow or orange light can indicate that the object of interest 602 is closer to the area of interest 702.

As another example, the guidance can be the brightness of the light generated by the light-generating device 206. The processor 200 can change the brightness of the light generated by the light-generating device 206 (which is facing the operator 404) based on how far or close the object of interest 602 is to the area of interest 702 in the image data 700. The magnitude of the difference between the location of the object of interest 602 and the area of interest 702 can determine the brightness or dimness of the flashes. For example, a dimmer light may indicate that the object of interest 602 is farther from the area of interest 702 while a brighter light can indicate that the object of interest 602 is closer to the area of interest 702. In one aspect, a combination if the frequency of flashes, color of the light, and/or brightness of the light may be used to inform the operator 404 how to move the mobile device 100.

In another example, the mobile device 100 may generate vibrations to indicate how far or close the object of interest 602 is from the area of interest 702 in the image data 700. For example, the mobile device 100 may have a moveable eccentric mass inside the housing 108 of the mobile device 100 that can be moved to cause the mobile device 100 to vibrate. The magnitude and/or frequency of the vibrations can change based on how far the object of interest 602 is from the area of interest 702 in the image data 700. For example, the magnitude and/or frequency of the vibrations may be reduced when the object of interest 602 is closer to the area of interest 702 than when the object of interest 602 is farther from the area of interest 702. Alternatively, the guidance may be provided in one or more other manners.

Based on the guidance that is generated, the operator 404 may move the mobile device 100. Flow of the method 300 can return to 304 so that additional image data 700 is obtained and examined to determine if one or more additional instructions need to be provided. Additional instructions may be provided until the operator 404 has moved the mobile device 100 so that the amount of overlap between the object of interest 602 and the area of interest 702 in the image data 700 is increased to at least the threshold described above. If, at 308, it is determined that the amount of overlap is at least as large as the designated threshold, then flow of the method 300 can proceed to 314. At 314, an image (e.g., the subsequent image) is obtained from the image data 700. This image may include the object of interest 602 being in the same or similar location as the area of interest 702. As a result, the operator 404 may be able to take a self-portrait image using the rear camera 204 without being able to see the display screen 104 of the mobile device 100.

In accordance with at least one embodiment herein, to the extent that mobile devices are discussed herein, it should be understood that they can represent a very wide range of devices, applicable to a very wide range of settings. Thus, by way of illustrative and non-restrictive examples, such devices and/or settings can include mobile telephones, tablet computers, and other portable computers such as portable laptop computers.

As will be appreciated by one skilled in the art, various aspects may be embodied as a system, method or computer (device) program product. Accordingly, aspects may take the form of an entirely hardware embodiment or an embodiment including hardware and software that may all generally be referred to herein as a "circuit," "module" or "system." Furthermore, aspects may take the form of a computer (device) program product embodied in one or more computer (device) readable storage medium(s) having computer (device) readable program code embodied thereon.

Any combination of one or more non-signal computer (device) readable medium(s) may be utilized. The non-signal medium may be a storage medium. A storage medium may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a dynamic random access memory (DRAM), a read-only memory (ROM), an erasable programmable read-only memory (EPROM or Flash memory), a portable compact disc read-only memory (CD-ROM), an optical storage device, a magnetic storage device, or any suitable combination of the foregoing.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of network, including a local area network (LAN) or a wide area network (WAN), or the connection may be made through other devices (for example, through the Internet using an Internet Service Provider) or through a hard wire connection, such as over a USB connection. For example, a server having a first processor, a network interface, and a storage device for storing code may store the program code for carrying out the operations and provide this code through its network interface via a network to a second device having a second processor for execution of the code on the second device.

Aspects are described herein with reference to the figures, which illustrate example methods, devices and program products according to various example embodiments. These program instructions may be provided to a processor of a general purpose computer, special purpose computer, or other programmable data processing device or information handling device to produce a machine, such that the instructions, which execute via a processor of the device implement the functions/acts specified.

The program instructions may also be stored in a device readable medium that can direct a device to function in a particular manner, such that the instructions stored in the device readable medium produce an article of manufacture including instructions which implement the function/act specified. The program instructions may also be loaded onto a device to cause a series of operational steps to be performed on the device to produce a device implemented process such that the instructions which execute on the device provide processes for implementing the functions/acts specified.

Although illustrative example embodiments have been described herein with reference to the accompanying figures, it is to be understood that this description is not limiting and that various other changes and modifications may be affected therein by one skilled in the art without departing from the scope or spirit of the disclosure.

The modules/applications herein may include any processor-based or microprocessor-based system including systems using microcontrollers, reduced instruction set computers (RISC), application specific integrated circuits (ASICs), field-programmable gate arrays (FPGAs), logic circuits, and any other circuit or processor capable of executing the functions described herein. Additionally or alternatively, the modules/controllers herein may represent circuit modules that may be implemented as hardware with associated instructions (for example, software stored on a tangible and non-transitory computer readable storage medium, such as a computer hard drive, ROM, RAM, or the like) that perform the operations described herein. The above examples are exemplary only, and are thus not intended to limit in any way the definition and/or meaning of the term "controller" or processor. The modules/applications herein may execute a set of instructions that are stored in one or more storage elements, in order to process data. The storage elements may also store data or other information as desired or needed. The storage element may be in the form of an information source or a physical memory element within the modules/controllers herein. The set of instructions may include various commands that instruct the modules/applications herein to perform specific operations such as the methods and processes of the various embodiments of the subject matter described herein. The set of instructions may be in the form of a software program. The software may be in various forms such as system software or application software. Further, the software may be in the form of a collection of separate programs or modules, a program module within a larger program or a portion of a program module. The software also may include modular programming in the form of object-oriented programming. The processing of input data by the processing machine may be in response to user commands, or in response to results of previous processing, or in response to a request made by another processing machine.

It is to be understood that the subject matter described herein is not limited in its application to the details of construction and the arrangement of components set forth in the description herein or illustrated in the drawings hereof. The subject matter described herein is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

It is to be understood that the above description is intended to be illustrative, and not restrictive. For example, the above-described embodiments (and/or aspects thereof) may be used in combination with each other. In addition, many modifications may be made to adapt a particular situation or material to the teachings herein without departing from its scope. While the dimensions, types of materials and coatings described herein are intended to define various parameters, they are by no means limiting and are illustrative in nature. Many other embodiments will be apparent to those of skill in the art upon reviewing the above description. The scope of the embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects or order of execution on their acts.

What is claimed is:

1. A method comprising:
  obtaining a reference image using a first camera disposed on a first side of an electronic device, and identifying an imaged body in the reference image, the reference image displayed on a display screen on the first side of the electronic device;
  receiving an operator-selected area on the display screen, the operator-selected area designating a position where the imaged body is to appear in a subsequent image acquired using a second camera disposed on an opposite, second side of the electronic device;
  obtaining image data using the second camera disposed on the second side of the electronic device;
  identifying the imaged body in the image data; and
  providing guidance to the operator of the electronic device based on a comparison between positions of the imaged body in the reference image and the image data and a location of the operator-selected area, the guidance notifying the operator how to move the electronic device so that the position of the imaged body in the image data is closer to being spatially aligned with the location of the operator-selected area.

2. The method of claim 1, further comprising obtaining the subsequent image of the imaged body from the image data after the guidance is provided, wherein a position of the imaged body in the subsequent image is closer to the location of the operator-selected area than prior to providing the guidance.

3. The method of claim 1, wherein obtaining the image data includes obtaining a self-portrait image of the operator.

4. The method of claim 1, wherein obtaining the image data and providing the guidance occur concurrently.

5. The method of claim 1, wherein providing the guidance includes presenting an audible instruction of a direction to move the electronic device relative to the operator.

6. The method of claim 1, wherein providing the guidance includes flashing a light on the electronic device that is visible to the operator during obtaining the image data.

7. The method of claim 6, wherein flashing the light includes changing a color of the light based on a magnitude of a difference between the location of the operator-selected area on the display screen and the position of the imaged body in the image data.

8. The method of claim 1, wherein providing the guidance includes generating a sound during obtaining the image data.

9. The method of claim 8, wherein generating the sound includes changing the sound based on a magnitude of a difference between the location of the operator-selected area and the position of the imaged body in the image data.

10. The method of claim 1, wherein providing the guidance includes vibrating the electronic device during obtaining the image data.

11. The method of claim 10, wherein vibrating the electronic device includes changing a vibration of the electronic device based on a magnitude of a difference between the location of the operator-selected area on the display screen and the position of the imaged body in the image data.

12. A device comprising:
  a housing having a first side and an opposite second side;
  a first camera on the first side of the housing;
  an electronic display on the first side of the housing;
  a second camera on the second side of the housing;
  a processor; and
  a storage medium storing program instructions accessible by the processor, wherein, responsive to execution of the program instructions, the processor:
    obtains a reference image using the first camera and identifies an imaged body in the reference image, the reference image displayed on the electronic display;
    receives an operator-selected area on the electronic display, the operator-selected area designating a position where the imaged body is to appear in a subsequent image acquired using the second camera;
    obtains image data using the second camera;
    identifies the imaged body in the image data; and
    provides guidance to an operator of the device based on a comparison between positions of the imaged body in the reference image and the image data and a location of the operator-selected area, the guidance notifying the operator how to move the housing so that the position of the imaged body in the image data is closer to being spatially aligned with the location of the operator-selected area.

13. The device of claim 12, wherein the processor obtains the subsequent image of the imaged body from the image data responsive to execution of the program instructions and after the guidance is provided, and wherein a position of the imaged body in the subsequent image is closer to the location of the operator-selected area than prior to providing the guidance.

14. The device of claim 12, wherein the image data includes a self-portrait image of the operator.

15. The device of claim 12, wherein the electronic display visually presents the image data on the electronic display while the image data is being obtained, wherein the electronic display is not visible to the operator of the device while the image data is obtained and displayed on the electronic display.

16. The device of claim 12, wherein the processor provides the guidance by changing a color of a light on the electronic device that is visible to the operator while obtaining the image data, and the processor changes the color of the light based on a magnitude of a difference between the location of the operator-selected area on the electronic display and the 17position of the imaged body in the image data.

17. A device comprising:
  a housing having a front camera and an electronic display on a front side of the housing and a rear camera on a rear side of the housing, the front camera obtaining a reference image that is displayed in the electronic display, the electronic display detecting a touch from an operator;
  a processor; and
  a storage medium storing program instructions accessible by the processor, wherein, responsive to execution of the program instructions, the processor identifies an imaged body in the reference image, designates a position of the detected touch on the electronic display as an operator-selected area on the electronic display where the imaged body is to appear in a subsequent image acquired using the rear camera, obtains image data using the rear camera, identifies the imaged body in the image data, compares positions of the imaged body in the reference image and the image data with a location of the operator-selected area, and provides guidance to the operator based on a difference between the position of the imaged body in the image data and the location of the operator-selected area on the electronic display, the guidance notifying the operator how to move the housing so that the position of the imaged body in the image data moves toward the location of the operator-selected area.

18. The device of claim 17, wherein the processor provides the guidance to include an audible instruction of a direction to move the housing relative to the operator, a light that is generated by a light-generating device on the housing and that changes based on a magnitude of the difference between the position of the imaged body in the image data and the location of the operator-selected area, a sound that changes based on the magnitude of the difference between the position of the imaged body in the image data and the location of the operator-selected area, a vibration of the housing that changes based on the magnitude of the difference between the position of the imaged body in the image data and the location of the operator-selected area, or a combination thereof.

19. The device of claim 17, further comprising a light device, wherein the processor provides the guidance by changing a color of light generated by the light device that is visible to the operator while obtaining the image data, and the processor changes the color of the light based on a magnitude of a difference between the location of the operator-selected area on the electronic display and the position of the imaged body in the image data.

* * * * *